United States Patent
Liu et al.

(10) Patent No.: US 10,625,491 B2
(45) Date of Patent: Apr. 21, 2020

(54) FLEXIBLE DEVICE

(71) Applicant: BOE TECHNOLOGY GROUP CO., LTD., Beijing (CN)

(72) Inventors: Lu Liu, Beijing (CN); Weifeng Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/528,635

(22) PCT Filed: Nov. 7, 2016

(86) PCT No.: PCT/CN2016/104846
§ 371 (c)(1),
(2) Date: May 22, 2017

(87) PCT Pub. No.: WO2017/113988
PCT Pub. Date: Jul. 6, 2017

(65) Prior Publication Data
US 2018/0290430 A1    Oct. 11, 2018

(30) Foreign Application Priority Data
Dec. 31, 2015 (CN) .......................... 2015 1 1032157

(51) Int. Cl.
*B32B 7/14* (2006.01)
*H05K 5/00* (2006.01)
(Continued)

(52) U.S. Cl.
CPC .................. *B32B 7/14* (2013.01); *G06F 1/16* (2013.01); *G09F 9/00* (2013.01); *G09F 9/30* (2013.01); *G09F 9/301* (2013.01); *H05K 5/0017* (2013.01); *B32B 2255/26* (2013.01); *B32B 2307/412* (2013.01); *B32B 2307/51* (2013.01); *B32B 2457/20* (2013.01); *G06F 1/1652* (2013.01)

(58) Field of Classification Search
CPC ....................................................... G06F 1/1652
See application file for complete search history.

(56) References Cited

U.S. PATENT DOCUMENTS

2014/0226275 A1* 8/2014 Ko .......................... G06F 1/1626
                                                                361/679.27
2015/0314561 A1* 11/2015 Kim ..................... B32B 37/1292
                                                                428/201
2017/0213846 A1    7/2017 Zhou

FOREIGN PATENT DOCUMENTS

CN    201757820 U    3/2011
CN    102902109 A    1/2013
(Continued)

OTHER PUBLICATIONS

First Office Action for Chinese Application No. 201511032157.3, dated Aug. 28, 2017, 6 Pages.
(Continued)

*Primary Examiner* — Ian A Rummel
(74) *Attorney, Agent, or Firm* — Brooks Kushman P.C.

(57) ABSTRACT

The present disclosure provides a flexible device, including a flexible module, a flexible support structure arranged opposite to the flexible module, and an adhesive structure configured to adhere the flexible module to the flexible support structure, and enable the flexible module to be slidable relative to the flexible support structure in the case that the flexible device is being bent.

16 Claims, 5 Drawing Sheets

(51) Int. Cl.
*G09F 9/30* (2006.01)
*G09F 9/00* (2006.01)
*G06F 1/16* (2006.01)

(56) References Cited

FOREIGN PATENT DOCUMENTS

| CN | 103985321 A | 8/2014 |
| CN | 103996695 A | 8/2014 |
| CN | 104752622 A | 7/2015 |
| CN | 204808776 U | 11/2015 |
| CN | 105513497 A | 4/2016 |
| CN | 205264264 U | 5/2016 |
| WO | 2005091110 A1 | 9/2005 |

OTHER PUBLICATIONS

International Search Report and Written Opinion for Application No. PCT/CN2016/104846, dated Feb. 6, 2017, 10 Pages.
Third Office Action for Chinese Application No. 201511032157.3, dated Sep. 7, 2018, 7 Pages.

\* cited by examiner

FLEXIBLE DEVICE

CROSS-REFERENCE TO RELATED APPLICATIONS

This application is the U.S. national phase of PCT Application No. PCT/CN2016/104846 filed on Nov. 7, 2016, which claims priority to Chinese Patent Application No. 201511032157.3 filed on Dec. 31, 2015, the disclosures of which are incorporated in their entirety by reference herein.

TECHNICAL FIELD

The present disclosure relates to the field of flexible display technology, in particular to a flexible device.

BACKGROUND

Currently, a bendable or foldable module, i.e., a flexible module, has been developed, and it is of a multiple-layer structure. For example, a flexible display panel designed on the basis of an electroluminescent structure usually includes such layers as a back film, a pixel control circuit, an electroluminescent pixel element, a barrier film (BF), a circular polarizer (C-POL), a touch element and a hard coat (HC) one on top of the other. Generally, the entire module has a thickness of 200 to 600 μm.

In the case that the flexible module and a mechanical structure for support and fixation are assembled into a machine, the mechanical structure may be fully attached and fixed to the flexible module, so the thickness of the flexible module may increase indirectly, and a position of a neutral layer of the flexible module may change (during a bending procedure of a material, an outer layer of the material may be stretched, an inner layer thereof may be squeezed, and there will inevitably exist on a cross section of the material a transition layer which is not stretched nor squeezed, i.e., a stress applied thereto is almost zero; this transition layer is called as the neutral layer of the material). On one hand, a larger bending force needs to be applied so as to bend the machine. On the other hand, the layers of the flexible module may easily be separated from each other, so a normal display effect may be adversely affected.

SUMMARY

An object of the present disclosure is to provide a flexible device, so as to overcome the defects caused by the change in a position of a neutral layer of the flexible device due to a connection mode between a flexible module and a support structure.

The present disclosure provides in some embodiments a flexible device, including: a flexible module; a flexible support structure arranged opposite to the flexible module; and an adhesive structure configured to adhere the flexible module to the flexible support structure, and enable the flexible module to be slidable relative to the flexible support structure in the case that the flexible device is being bent.

In a possible embodiment of the present disclosure, the flexible module is a flexible display panel, and the flexible support structure is arranged on the flexible display panel at a side away from a display surface of the flexible display panel.

In a possible embodiment of the present disclosure, in a bending direction of the flexible device, a difference ΔL between a length of the flexible display panel and a length of the flexible support structure is calculated using the equation:

$$\Delta L = \sum_{k=1}^{n} \theta_k \Delta R_k = \sum_{k=1}^{n} \theta_k (R_{k1} - R_{k2}),$$

where n represents the number of bending portions of the flexible device, $\theta_k$ represents a bending angle at a $k^{th}$ bending position, $R_{k1}$ represents a bending radius of the flexible support structure at the $k^{th}$ bending position, and $R_{k2}$ represents a bending radius of the flexible display panel at the $k^{th}$ bending position.

In a possible embodiment of the present disclosure, the adhesive structure is arranged at one or more positions between the flexible module and the flexible support structure.

In a possible embodiment of the present disclosure, the adhesive structure is of a dot-like or strip-like shape.

In a possible embodiment of the present disclosure, the strip-like adhesive structure extends in a direction intersecting the bending direction of the flexible device.

In a possible embodiment of the present disclosure, the strip-like adhesive structure extends in a direction perpendicular to the bending direction of the flexible device.

In a possible embodiment of the present disclosure, the flexible device further includes at least one support member fixed to the flexible support structure at a side facing the flexible module, arranged in contact with the flexible module, and slidable relative to the flexible module in the case that the flexible device is being bent.

In a possible embodiment of the present disclosure, the support member is of a planar shape and arranged in an entire region between the flexible module and the flexible support structure other than a region where the adhesive structure is located.

In a possible embodiment of the present disclosure, the support member includes at least one strip-like support member.

In a possible embodiment of the present disclosure, the flexible device further includes a filler arranged between the flexible module and the flexible support structure and at a region defined by the support member and the adhesive structure, or arranged between the flexible module and the flexible support structure and at a region defined by two adjacent support members.

In a possible embodiment of the present disclosure, the filler is a solid or liquid.

In a possible embodiment of the present disclosure, the adhesive structure is arranged at all the regions between the flexible module and the flexible support structure and has an elastic modulus of 80 pa to 500 Mpa.

According to the embodiments of the present disclosure, the flexible device includes the flexible module, the flexible support structure arranged opposite to the flexible module, and the adhesive structure configured to adhere the flexible module to the flexible support structure and enable the flexible module to be slidable relative to the flexible support structure. Through the adhesive structure, it is able to adhere the flexible module to the flexible support structure, and meanwhile provide sufficient room for the flexible module to slide relative to the flexible support structure in the case that the flexible device is being bent. In the case that the flexible module and the flexible support structure are assembled into a machine through the adhesive structure, the flexible module is relatively separated from the flexible support structure, without changing a position of a neutral layer in the flexible module. As a result, it is able to reduce the possibility of the separation of layers from each other in the flexible module during a bending procedure. In addition, in the case that the flexible module has a fixed thickness, it is able to bend the flexible device to a smaller bending radius.

DETAILED DESCRIPTION

Figure 1A:
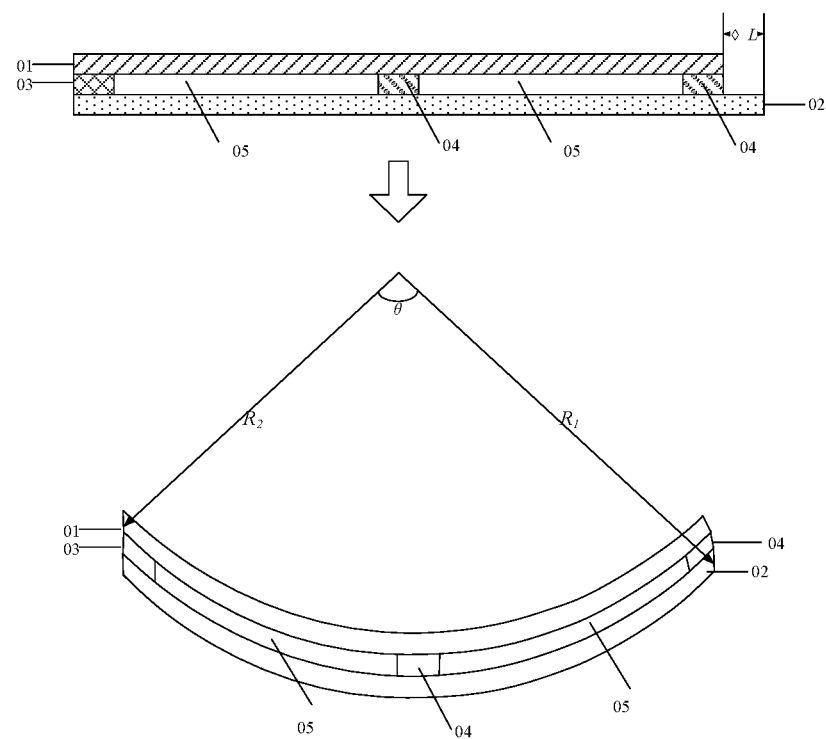
FIGS. 1a and 1b are schematic views showing a flexible device according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Shapes and sizes of the layers in the drawings are for illustrative purposes only, but shall not be used to reflect any actual scale.

The present disclosure provides in some embodiments a flexible device, including: a flexible module; a flexible support structure arranged opposite to the flexible module; and an adhesive structure configured to adhere the flexible module to the flexible support structure, and enable the flexible module to be slidable relative to the flexible support structure in the case that the flexible device is being bent.

Here, the adhesive structure may be implemented by a conventional optical adhesive. It may be a silica gel-based optical adhesive, or an acrylate-based optical adhesive, e.g., optically clear adhesive (OCA). The OCA is a special adhesive for adhering a transparent optical element (e.g., a lens). Usually, the OCA has such advantages as being colorless and transparent, having a light transmittance of more than 90%, excellent adhesion strength, being cured at a room or intermediate temperature, and having small curing shrinkage. The OCA is one of the important raw materials for a touch panel. For example, it may be manufactured by adhering release films onto upper and lower surfaces of a non-matrix material made of an optical acrylic adhesive, and it may serve as a double-sided adhesive tape for the non-matrix material.

According to the embodiments of the present disclosure, through the adhesive structure, it is able to adhere the flexible module to the flexible support structure, and meanwhile provide sufficient room for the flexible module to slide relative to the flexible support structure in the case that the flexible device is being bent. In the case that the flexible module and the flexible support structure are assembled into a machine through the adhesive structure, the flexible module is relatively separated from the flexible support structure, without changing a position of a neutral layer in the flexible module. As a result, it is able to reduce the possibility of the separation of layers from each other in the flexible module during a bending procedure. In addition, in the case that the flexible module has a fixed thickness, it is able to bend the flexible device to a smaller bending radius.

During the implementation, the flexible module may be a flexible display panel. At this time, the flexible support structure is usually located on the flexible display panel at a side away from a display surface of the flexible display panel. The following description will be given by taking the flexible display panel as an example.

Arrangement modes of the adhesive structure capable of adhering the flexible module to the flexible support structure and enabling the flexible module to slide relative to the flexible support structure will be described hereinafter in conjunction with two embodiments.

Figure 1B:
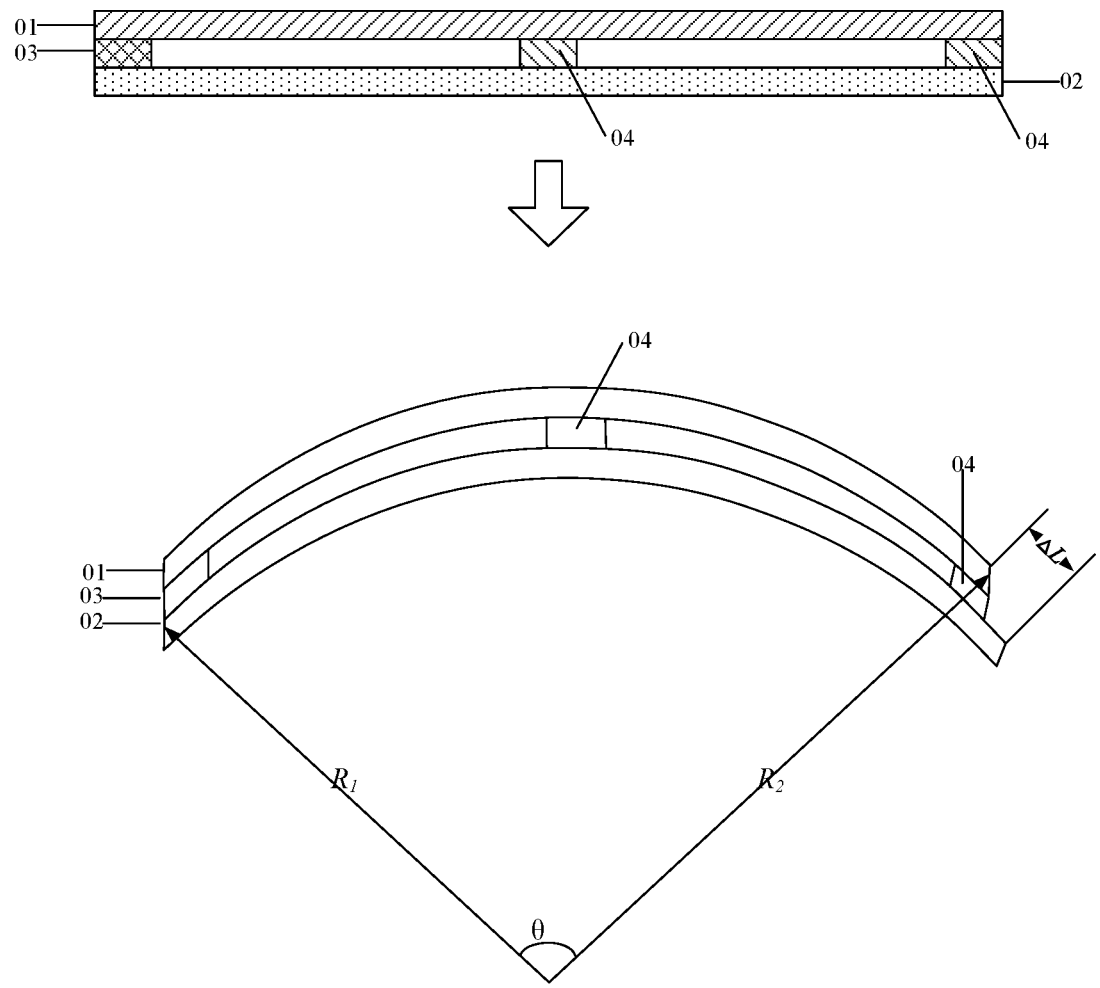

In one embodiment of the present disclosure, as shown in FIGS. 1a and 1b, the adhesive structure 03 may be arranged at one or more positions between the flexible module 01 and the flexible support structure 02, i.e., the adhesive structure 03 is not used to adhere an entire surface of the flexible module 01 to an opposite surface of the flexible support structure 02. In this way, it is able to ensure that the flexible module 01 may slide relative to the flexible support structure 02 in the case that the flexible device is being bent.

During the implementation, the adhesive structure 03 may be arranged at any position or positions between the flexible module 01 and the flexible support structure 02. In a possible embodiment of the present disclosure, as shown in FIGS. 1a and 1b, the adhesive structure 03 is merely arranged at one position, e.g., at a peripheral position, between the flexible module 01 and the flexible support structure 02.

Figure 2:
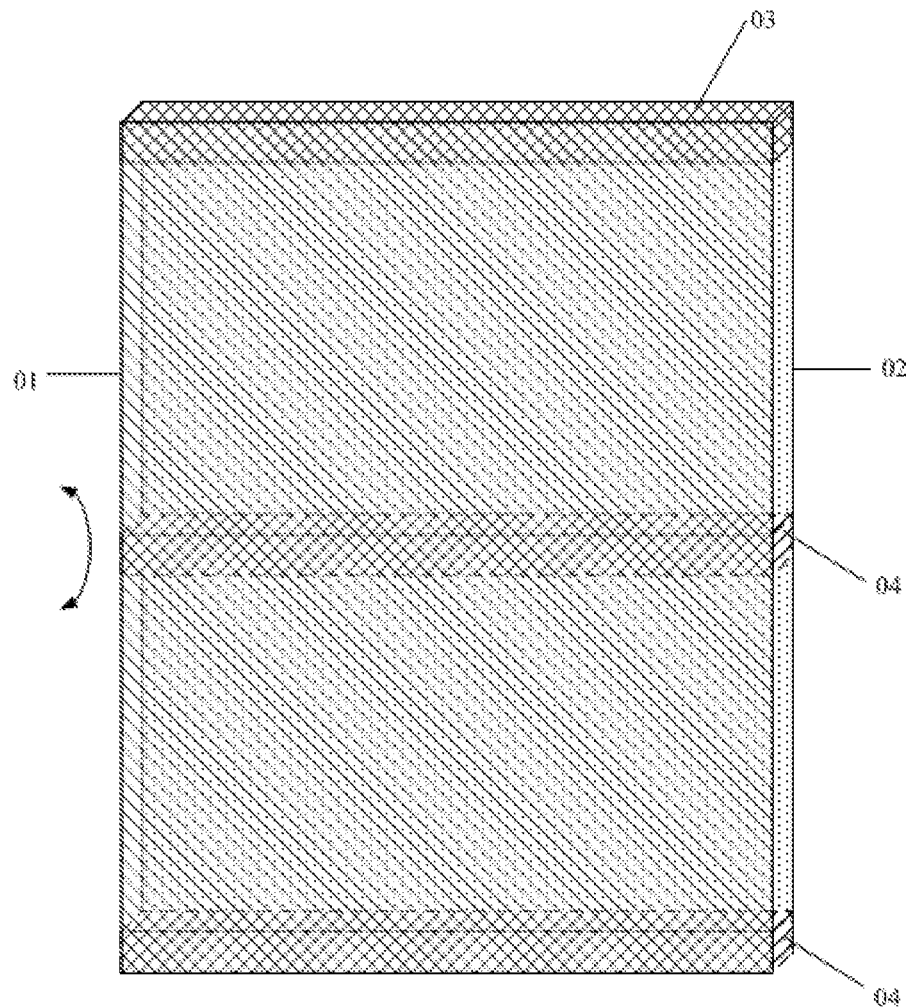
FIG. 2 is a solid view of the flexible device according to one embodiment of the present disclosure.

During the implementation, the adhesive structure 03 may be of various shapes, e.g., a dot-like shape, or a strip-like shape as shown in FIG. 2.

In the case that the adhesive structure 03 is of a strip-like shape, as shown in FIG. 2, usually the adhesive structure 03 may extend in a direction intersecting a bending direction (a direction shown by an arrow in FIG. 2) of the flexible device, i.e., an extending direction of the strip-like adhesive structure 03 may not be identical to the bending direction of the flexible device.

Figure 3:
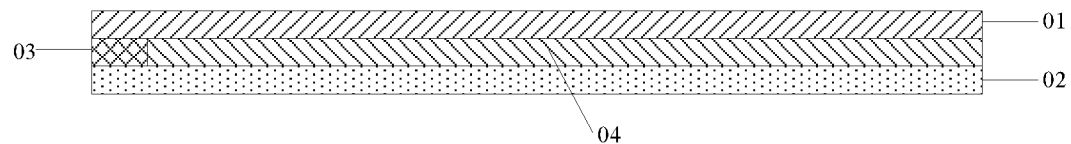
FIG. 3 is another schematic view showing the flexible device according to one embodiment of the present discourse.

In a possible embodiment of the present disclosure, the extending direction of the strip-like adhesive structure 03 may be perpendicular to the bending direction of the flexible device. As shown in FIG. 3, the bending direction of the flexible device is a direction in which a long side of the flexible device extends, and the extending direction of the strip-like adhesive structure 03 is a direction in which a short side of the flexible device extends.

In addition, as shown in FIG. 2, the flexible device may further include at least one support member 04 fixed to the flexible support structure 02 at a side facing the flexible module 01, arranged in contact with the flexible module 01, and slidable relative to the flexible module 01 in the case that the flexible device is being bent. In FIG. 2, two support members 04 are fixed to the flexible support structure 02. Because the adhesive structure 03 is merely arranged at some regions between the flexible module 01 and the flexible support structure 02, the support member 04 may function as supporting the other regions between the flexible module 01 and the flexible support structure 02.

During the implementation, the support member 04 may be of various shapes. For example, as shown in FIG. 3, the support member 4 may be of a planar shape and arranged at all the regions between the flexible module 01 and the flexible support structure 02 other than a region where the adhesive structure 03 is located. In other words, a gap between the flexible module 01 and the flexible support structure 02 may be entirely filled up with the adhesive structure 03 and the support member 04.

During the implementation, as shown in FIG. 2, the support member 04 may also include at least one strip-like support member 04. At this time, there is a space between the adhesive structure 03 and the support member 04. In the case of a plurality of strip-like support members 04, there is also a space between the two adjacent support members 04.

In a possible embodiment of the present disclosure, the flexible device may further include a filler 05 arranged between the flexible module 01 and the flexible support structure 02, and at a region defined by the support member 04 and the adhesive structure 03 or at a region defined by the two adjacent support members 04. The filler 05 may function as a lubricant and partially as a support, so as to facilitate the sliding of the flexible module 01 relative to the flexible support structure 02 in the case that the flexible device is being bent.

To be specific, the filler may be a solid or liquid, and it may be made of various materials, which will not be particularly defined herein.

Figure 4A:
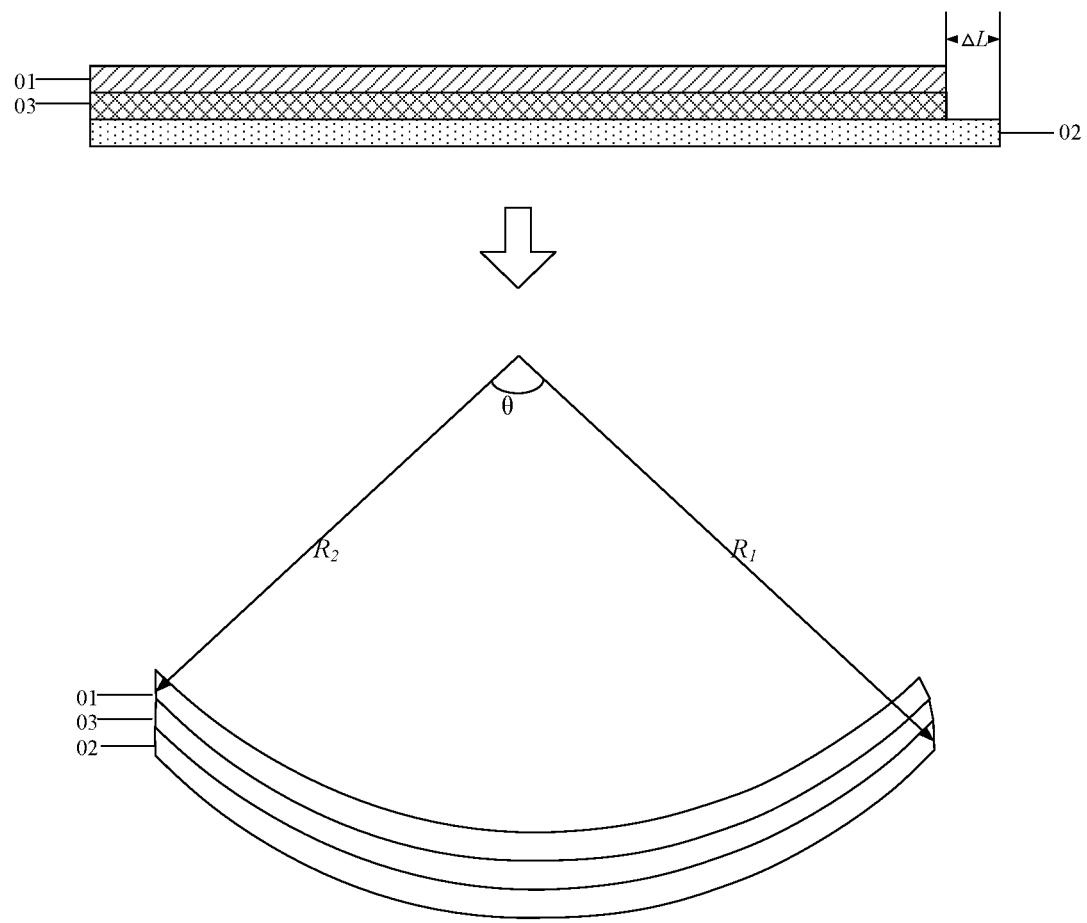
FIGS. 4a to 4c are another three schematic views showing the flexible device according to one embodiment of the present disclosure.
Figure 4B:
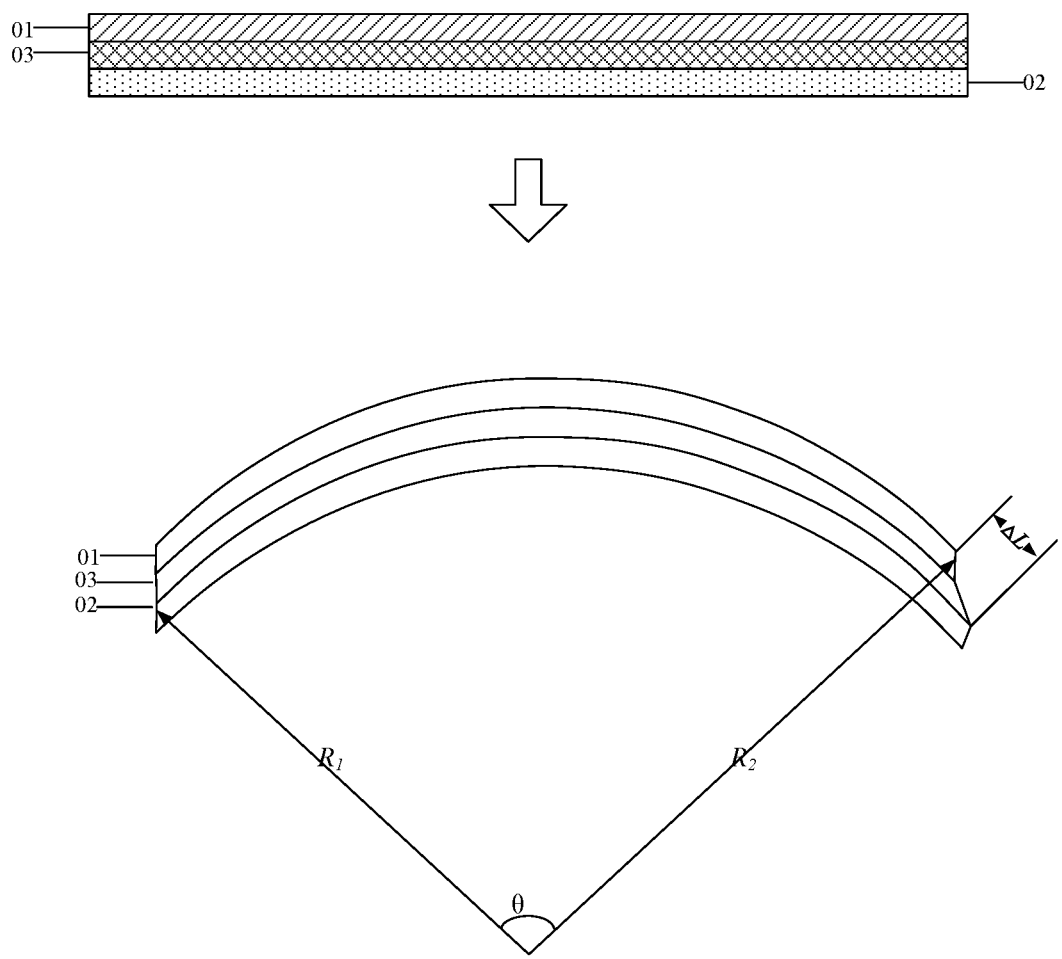

In another embodiment of the present disclosure, as shown in FIGS. 4a and 4b, the adhesive structure 03 may be arranged at all the regions between the flexible module 01 and the flexible support structure 02, i.e., the entire surface of the flexible module 01 may be adhered to the opposite surface of the flexible support structure 02 through the adhesive structure 03. At this time, in order to enable the flexible module 01 to slide relative to the flexible support structure 02, the adhesive structure 03 needs to be elastically deformed in the case that the flexible device is being bent. Hence, the adhesive structure 03 may be made of a material having a very small elastic modulus, so as to ensure the elastic deformation. To be specific, the adhesive structure may have an elastic modulus of 80 pa to 500 Mpa.

The adhesive structure 03 capable of adhering the flexible module 01 to the flexible support structure 02 and enabling the flexible module 01 to be slidable relative to the flexible support structure 02 has been described hereinbefore in conjunction with the above-mentioned two embodiments. Of course, any other adhesive structure capable of achieving the mentioned effect will also fall within the scope of the present disclosure.

In the case that the flexible device is being bent, there is inevitably a difference between a length of the flexible module 01 and a length of the flexible support structure 02 in the bending direction. For example, as shown in FIGS. 1a and 4a, in the case that the flexible device is bent inwardly toward the flexible display panel as the flexible module 01, i.e., toward the display surface of the flexible display panel, $\Delta L = \theta(R_1 - R_2)$, where $R_1$ represents a bending radius of the flexible support structure 02, $R_2$ represents a bending radius of the flexible display panel, and $\theta$ represents a bending angle. For another example, as shown in FIGS. 1b and 4b, in the case that the flexible device is bent outwardly toward the flexible display panel as the flexible module 01, i.e., toward a side away from the display surface of the flexible display panel, $\Delta L = \theta(R_2 - R_1)$, where $R_1$ represents a bending radius of the flexible support structure 02, $R_2$ represents a bending radius of the flexible display panel, and $\theta$ represents a bending angle.

Figure 4C:
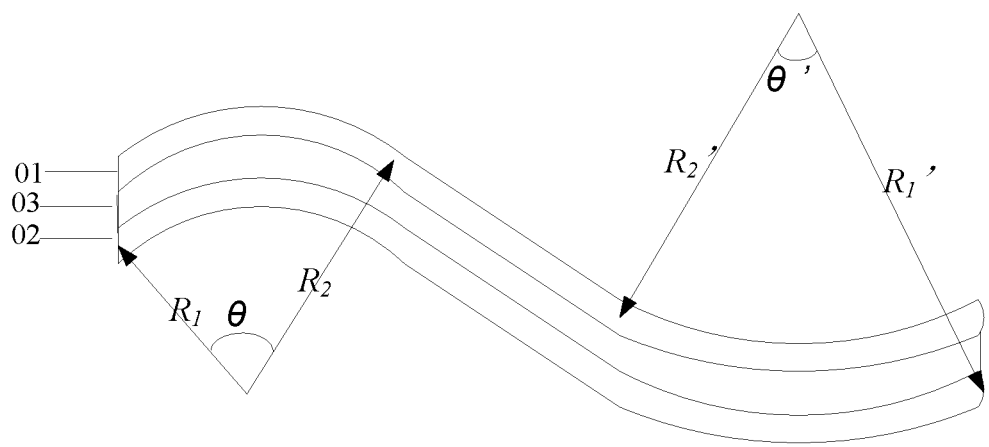

Based on the above, in the case that the flexible device includes a plurality of bending portions, e.g., two bending portions as shown in FIG. 4c, a difference $\Delta L$ between the length of the flexible display panel and the length of the flexible support structure 02 may be calculated using the equation:

$$\Delta L = \sum_{k=1}^{n} \theta_k \Delta R_k = \sum_{k=1}^{n} \theta_k (R_{k1} - R_{k2}),$$

where n represents the number of the bending portions of the flexible device, $\theta_k$ represents a bending angle at a $k^{th}$ bending position, $R_{k1}$ represents a bending radius of the flexible support structure at the $k^{th}$ bending position, and $R_{k2}$ represents a bending radius of the flexible display panel at the $k^{th}$ bending position.

According to the embodiments of the present disclosure, the flexible device includes the flexible module, the flexible support structure arranged opposite to the flexible module, and the adhesive structure configured to adhere the flexible module to the flexible support structure and enable the flexible module to be slidable relative to the flexible support structure. Through the adhesive structure, it is able to adhere the flexible module to the flexible support structure, and meanwhile provide sufficient room for the flexible module to be slidable relative to the flexible support structure in the case that the flexible device is being bent. In the case that the flexible module and the flexible support structure are assembled into a machine through the adhesive structure, the flexible module is relatively separated from the flexible support structure, without changing a position of a neutral layer in the flexible module. As a result, it is able to reduce the possibility of the separation of layers from each other in the flexible module during a bending procedure. In addition, in the case that the flexible module has a fixed thickness, it is able to bend the flexible device to a smaller bending radius.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:
1. A flexible device, comprising:
a flexible module;
a flexible support structure arranged opposite to the flexible module; and
an adhesive structure configured to adhere the flexible module to the flexible support structure, and enable the flexible module to be slidable relative to the flexible support structure in the case that the flexible device is being bent; and at least one support member fixed to the flexible support structure at a side facing the flexible module, arranged in contact with the flexible module, and slidable relative to the flexible module in the case that the flexible device is being bent, wherein the adhesive structure is arranged at one or more positions between the flexible module and the flexible support structure, the support member is of a planar shape and arranged at all regions between the flexible module and the flexible support structure other than a region where the adhesive structure is located.

2. The flexible device according to claim 1, wherein the flexible module is a flexible display panel, and the flexible support structure is arranged on the flexible display panel at a side away from a display surface of the flexible display panel.

3. The flexible device according to claim 1, wherein the adhesive structure is of a strip-like shape.

4. The flexible device according to claim 3, wherein the strip-like adhesive structure extends in a direction intersecting a bending direction of the flexible device.

5. The flexible device according to claim 4, wherein the strip-like adhesive structure extends in a direction perpendicular to the bending direction of the flexible device.

6. The flexible device according to claim 1, wherein a gap between the flexible module and the flexible support structure is entirely filled up with the adhesive structure and the support member.

7. The flexible device according to claim 2, wherein the adhesive structure is arranged at all regions between the flexible module and the flexible support structure and has an elastic modulus of 80 pa to 500 Mpa.

8. The flexible device according to claim 1, wherein the adhesive structure is of a dot-like shape.

9. The flexible device according to claim 1, wherein the support member comprises at least one strip-like support member.

10. A flexible device, comprising:
a flexible module;
a flexible support structure arranged opposite to the flexible module;
an adhesive structure configured to adhere the flexible module to the flexible support structure, and enable the flexible module to be slidable relative to the flexible support structure in the case that the flexible device is being bent; and at least one support member fixed to the flexible support structure at a side facing the flexible module, arranged in contact with the flexible module, and slidable relative to the flexible module in the case that the flexible device is being bent, wherein the adhesive structure is arranged at one or more positions between the flexible module and the flexible support structure, wherein the support member comprises at least one strip-like support member wherein the flexible device further comprises a filler arranged between the flexible module and the flexible support structure and at a whole region defined by the support member and the adhesive structure, or arranged between the flexible module and the flexible support structure and at a whole region defined by two adjacent support members.

11. The flexible device according to claim 10, wherein the filler is a solid or liquid.

12. The flexible device according to claim 10, wherein the adhesive structure and the support member are arranged at a same layer, and a filler is arranged between the adhesive structure and the support member and between two adjacent support members.

13. The flexible device according to claim 10, wherein the adhesive structure is arranged at all regions between the flexible module and the flexible support structure and has an elastic modulus of 80 pa to 500 Mpa.

14. The flexible device according to claim 10, wherein the strip-like adhesive structure extends in a direction intersecting a bending direction of the flexible device.

15. A flexible device, comprising:
a flexible module;
a flexible support structure arranged opposite to the flexible module;
an adhesive structure configured to adhere the flexible module to the flexible support structure, and enable the flexible module to be slidable relative to the flexible support structure in the case that the flexible device is being bent, wherein the adhesive structure is arranged at all regions between the flexible module and the flexible support structure and has an elastic modulus of 80 pa to 500 Mpa.

16. The flexible device according to claim 14, wherein the strip-like adhesive structure extends in a direction perpendicular to the bending direction of the flexible device.

* * * * *